(12) United States Patent
Seo et al.

(10) Patent No.: US 6,469,993 B1
(45) Date of Patent: Oct. 22, 2002

(54) METHOD FOR CONTROLLING TRAFFIC LOAD IN MOBILE COMMUNICATION SYSTEM

(75) Inventors: Chang Keun Seo, Inchon-kwangyoksi; Cheol Kyun Heo, Kyungki-do, both of (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,734

(22) Filed: Dec. 31, 1998

(30) Foreign Application Priority Data

Sep. 15, 1998 (KR) .............................. 98/38097

(51) Int. Cl.$^7$ ................................. H04Q 7/00
(52) U.S. Cl. ................. 370/329; 370/331; 370/230; 455/452
(58) Field of Search ................. 370/229, 230, 370/231, 232, 233, 234, 235, 236, 319, 322, 324, 329, 330, 337, 346, 347, 461, 462, 471, 521, 468, 331, 444, 445; 455/450, 451, 452, 453, 454, 455, 512, 527, 166.2

(56) References Cited

U.S. PATENT DOCUMENTS

| | | | | |
|---|---|---|---|---|
| 4,940,974 A | * | 7/1990 | Sojka | 370/346 |
| 5,371,780 A | * | 12/1994 | Amitay | 370/335 |
| 5,613,211 A | * | 3/1997 | Matsuno | 370/350 |
| 5,729,542 A | * | 3/1998 | Dupont | 370/346 |
| 5,752,193 A | * | 5/1998 | Scholefield et al. | 455/452 |
| 5,754,541 A | * | 5/1998 | Glisic et al. | 370/335 |
| 6,061,340 A | * | 5/2000 | Albrow et al. | 370/337 |
| 6,108,321 A | * | 8/2000 | Anderson et al. | 370/329 |
| 6,262,981 B1 | * | 7/2001 | Schmutz | 370/347 |

* cited by examiner

Primary Examiner—Ricky Ngo
Assistant Examiner—Phuc Tran
(74) Attorney, Agent, or Firm—Fleshner & Kim, LLP

(57) ABSTRACT

Method for controlling a traffic load in a mobile communication system, including the steps of (1) providing dynamic priority group numbers(P_DPROTG) which will be made available depending on a traffic load to each terminal which has a predefined priority in a cell, the dynamic priority group numbers(P_DPROTG) being provided in a system, (2) transmitting a permitted dynamic priority group number(P-DPROTG) from the system to each terminal in fixed time intervals depending on the traffic load, (3) each terminal calculating a dynamic priority(DRPOT) of the terminal, (4) each terminal comparing the P_DPROTG from the system and the DPROT calculated by the terminal itself, to determine a dynamic priority group number to which the terminal belongs, and (5) according to a result of the determination in the step (4), each terminal determining, and executing a user data transmission to the system.

27 Claims, 3 Drawing Sheets

FIG. 3

| Primitive Type | Primitive | Parameters |
| --- | --- | --- |
| Request | SetFCHpdprotG | P_DPROTG value |
| Confirm | SetFCHpdprotG | |
| Request | SetDCCHpdprotG | P_DPROTG value |
| Confirm | SetDCCHpdprotG | |
| Request | ResetFCHpdprotG | default value : 0 |
| Confirm | ResetFCHpdprotG | |
| Request | ResetFCHpdprotG | default value : 0 |
| Confirm | ResetFCHpdprotG | |

METHOD FOR CONTROLLING TRAFFIC LOAD IN MOBILE COMMUNICATION SYSTEM

BACKGROUND OF THE INVENTION

1. Field of the Invention

The present invention relates to a method for controlling a traffic load in a mobile communication system, and more particularly, to a method for controlling a traffic load in a mobile communication system, which can assure a quality of a packet data service required in a CDMA mobile communication system.

2. Background of the Related Art

In general, a plurality of terminals which have a packet data service available may be present in a cell of a base station. Therefore, if the plurality of terminals request the packet data services on the same time, requests over an available cell service capacity are disregarded. In this instance, there may be a case when a particular terminal is always served well while another particular terminal is not served, continuously. And, even under a traffic congestion, it is desirable that a terminal with a preset higher service grade compared to a terminal being served currently is supported for the service. Therefore, it is required that the system distributes the traffic load for assuring a service quality required by all the terminals in the cell. Moreover, there can be a case when a terminal with high predefined priority due to handoff should be served in a cell of a heavy traffic load. That is, a traffic overload congestion may be occurred in the cell. Actually, since a countermeasure for the occurrence of the traffic load congestion or for a situation when assurance of a bandwidth and a duration required in a supplemental channel request message(SCRM) from a terminal is difficult in the occurrence of the traffic load congestion, a next generation system provides a supplemental channel assignment message(SCAM) with the bandwidth and the duration considering a capacity.

However, current SCAM has no definition on taking the predefined priority into account in consideration of a service quality. The related art method has a problem in that all the services required in a traffic load congestion are refused. In conclusion, no next generation mobile communication system suggested up to now have provided a countermeasure on the traffic load control.

SUMMARY OF THE INVENTION

Accordingly, the present invention is directed to a method for controlling a traffic load in a mobile communication system that substantially obviates one or more of the problems due to limitations and disadvantages of the related art.

An object of the present invention is to provide a method for controlling a traffic load in a mobile communication system, which can assure a quality of a packet data service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in the method for controlling a traffic load in a mobile communication system, the system prepares dynamic priority numbers of each terminal in a form of a table in advance for providing to each terminal according to a traffic load. And, in a certain traffic load congestion, each terminal calculates a dynamic priority for the terminal. A sequence of a packet data service of each terminal is determined based on the dynamic priority group number and a group parameter the system permits to serve.

In other aspect of the present invention, there is provided a method for controlling a traffic load in a mobile communication system, in which dynamic priority group numbers (P_DPROTG) which will be made available to each terminal in a cell depending on a traffic load is prepared in the system. Then, a permitted dynamic priority group number (P_DPROTG) is transmitted from the system to each terminal in fixed time intervals depending on the traffic load. In the meantime, each terminal calculates a dynamic priority (DRPOT) of the terminal. Each terminal compares the P_DPROTG from the system and the DPROT calculated by the terminal itself, to determine a dynamic priority group number to which the terminal belongs. According to a result of the determination, each terminal determines, and executes a user data transmission to the system. Thus, a quality of each packet data service is assured to a certain extent in the traffic load congestion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
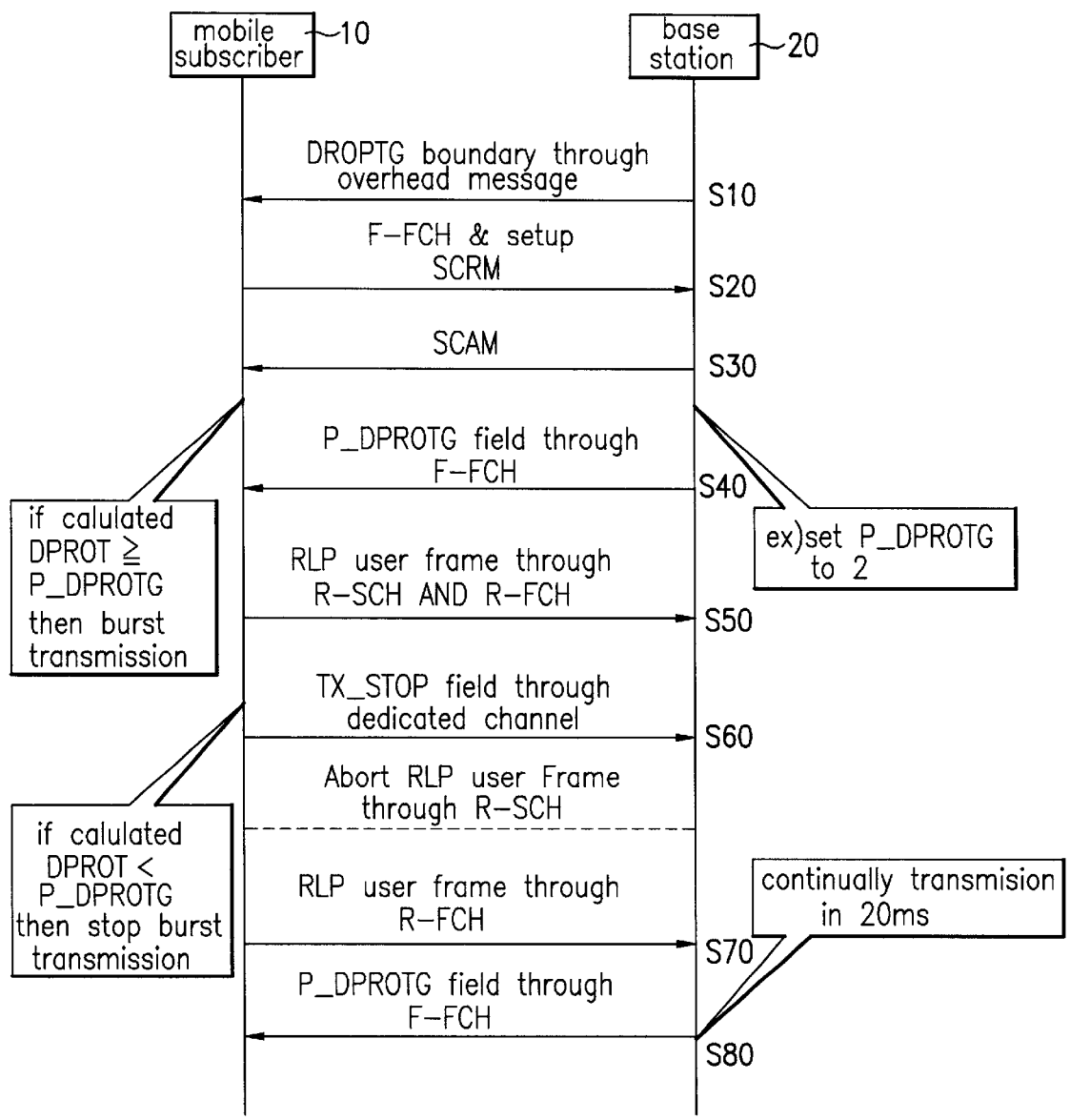
FIG. 1 illustrates a diagram showing a protocol procedure between a mobile subscriber (MS) and a base station(B S) in accordance with a preferred embodiment of the present invention.
Figure 2:
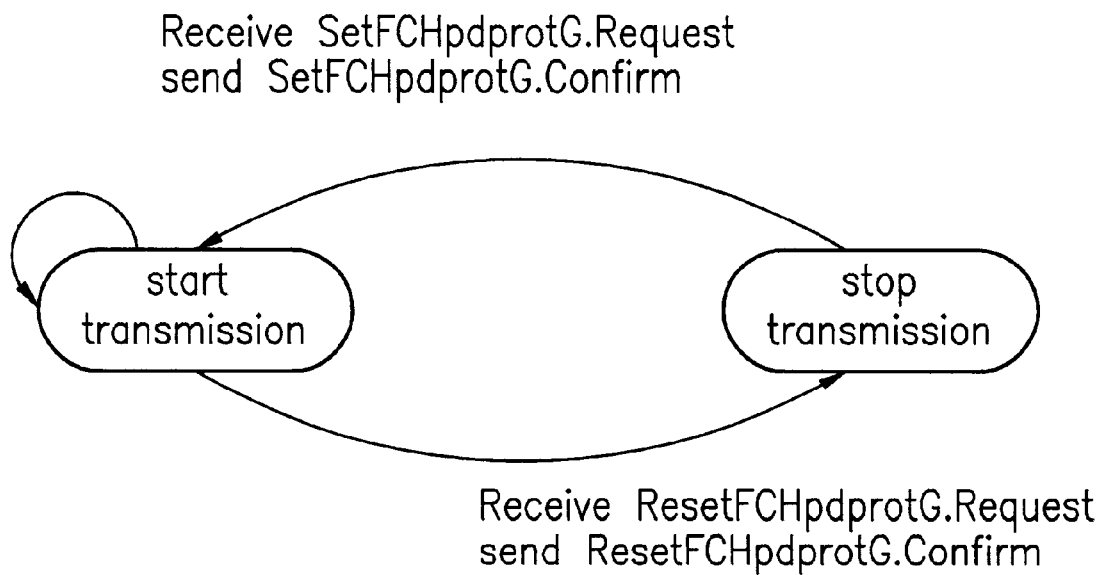
FIG. 2 illustrates a state diagram on a MUX and a QoS sublayer for a dynamic priority group number field(P_DPROTG) in a base station in accordance with a preferred embodiment of the present invention; and, FIG. 3 illustrates a table showing a service interface primitive of a MUX and a QoS sublayer at the base station.

Reference will now be made in detail to the preferred embodiments of the present invention, examples of which are illustrated in the accompanying drawings. FIG. 1 illustrates a diagram showing a protocol procedure between a mobile subscriber (MS) and a base station(BS) in accordance with a preferred embodiment of the present invention, FIG. 2 illustrates a state diagram on a MUX and a QoS sublayer for a dynamic priority group number field(P_DPROTG) in a base station in accordance with a preferred embodiment of the present invention, and FIG. 3 illustrates a table showing a service interface primitive of a MUX and a QoS sublayer at the base station.

In the present invention, at first, dynamic priorities of mobile subscribers are calculated. The dynamic priority (DPROT) is calculated with an equation (1), below.

$$DPROT = K(WQ + SQ)/SQ \quad (1)$$

Where, DPROT denotes a dynamic priority, WQ denotes a waited quantity, SQ denotes a served quantity, WQ+SQ denotes data quantity required through a supplemental channel request message(SCRM), and K is a proportional constant based on a predefined priority. K is fixed according to a priority of a service itself, and a factor is a transit delay(TD) and a permitted peak rate(PPR). Therefore, the coefficient can be expressed as equation (2), below.

$$K=F(TD, PR) \qquad (2)$$

An available traffic capacity in a cell can be determined by a bandwidth, data rate, Eb/No, and the like, and may be different depending on system managers. Therefore, a determination on a traffic overload in the cell is dependent on an embodiment of the cell. In general, each terminal has its own dynamic priority. Therefore, since management of the dynamic priority for the system or the terminal itself is complicated, it is favorable to manage the dynamic priorities in a number of groups. In detail, it is assumed that the dynamic priorities are divided into, for example, four groups. In this instance, there are a group 1, a group 2, a group 3, and a group 4. The number of groups may be varied depending on a cell size and environment of actual system. The traffic load may be considered in a forward direction side and reverse direction side. In this embodiment, a traffic load is taken into consideration, which is occurred when a data which burst in a reverse direction side, i.e., from a mobile subscriber side, i.e., MS side, to a base station side is send.

A protocol procedure between the base station and the mobile subscriber will be explained in detail with reference to FIGS. 1~3.

First, the base station informs a total number of groups set in the current base station and dynamic priority boundaries to all terminals 10 in a cell the terminals 10 in through a paging channel or common channel in an overhead message at an idle state. A maximum value is provided as the dynamic priority boundary of each group, so that a dynamic priority boundary of one group is to be from a maximum value of a group one stage lower than the group in question+1 to a maximum value of the group in question. Forward and reverse traffic dedicated channels(or fundamental channels) are set up between the system 20 and the terminal 10 according to a preset protocol. The reverse traffic channel is a channel from the terminal 10 to the base station 20, and the forward traffic channel is a channel from the base station 20 to the terminal 10. Under this situation, when the terminal 10 provides a supplemental channel request message(SCRM) to the base station 20 through the set up reverse traffic channel(S20), the base station 20 provides a supplemental channel assignment message(SCAM) which is taken into consideration of its own capacity to the terminal 10 through the set up forward traffic channel in response to the SCRM. (S30).

In the while, the system(or the base station) monitors a traffic load congestion. Herein, the system may be the foregoing base station itself or a base station controller in the base station. For reference, a base station is provided with the base station controller(BSC) and a base transceiver subsystem(BTS). The system will be called as a base station, hereafter. Then, the base station 20 provides available group number field(P_DPROTG) to each terminal 10 of which packet data service is in an active state through the forward traffic channel. The multiplexer and the QoS sublayer is service provider as well as a service user of the group number field (P_DPROTG). A resource control, receiving the group number field(P_DPROTG) from the signaling control, provides the same to the Mux and QoS control using indication primitive. That is, the group number field(P_DPROTG) is provided added to a physical channel(i.e., the forward channel) indicated by the Mux QoS control. The group number field(P_DPROTG) is provided from the base station 20 to the terminal 10 through the fundamental channel or dedicated control. (S40). In other words, the group number field(P_DPROTG) is not provided through the supplemental channel. And, since the group number field(P_DPROTG) informs an available dynamic priority group to the terminal, the base station has a dynamic priority group table to be made available differently depending on a traffic load. The group number field(P_DPROTG) to be made available differently depending on a traffic load is transmitted by the base station in 20 ms units. Therefore, the base station in a traffic load congestion varies the available group number field(P DPROTG) in conducting a service the most suitable to a quality the service users require.

And, if the dynamic priority group(DPROTG) in the group number field(P_DPROTG) is set to '0', each terminal which is served of a packet data service regularly provides a user data frame to the base station 20 through the reverse traffic channel(R-SCH and R-FCH).(S50). If the dynamic priority group(DPROTG) is set to a value other than '0', each of the terminals being served of a packet data service calculates a dynamic priority for itself, to determine to which i-d group the terminal belongs. For example, if the dynamic priority group(DPROTG) the system(or the base station) permits is 2, the terminal 10 can be served in the same service in a bandwidth the same with the above continuously, if the group the terminal 10 belongs is any one of G1 or G2(DPROT>P-DPROTG). That is, the terminal 10 may execute a burst-transmission. However, if the group the terminal belongs is any one of G3 or G4(DPROT<P-DPROTG), the RLP user frame through the reverse supplemental channel(R-SCH) is aborted. Then, the terminal 10 should wait for a data transmission. As an actual waiting time period is short, it is not a withdrawal of the physical code channel(in this instance, R-SCH), but a blocking of a burst transmission for a time period. For the while, the reverse direction transmission through the channel(the reverse supplemental channel:R-SCH or reverse dedicated control channel:R-DCCH) is made, continuously. And, since this process is done in realtime, it is desirable that the group number field(P-DPROTG) is added to the multiplex sublayer matched to a frame boundary of the traffic channel rather than providing it through a message. The terminal, which should calculate a group to which it belongs and wait for a data transmission, informs a transmission "OK" state, or a transmission "NOT OK" state to the base station 20 through a reverse channel(R-SCH or R-DCCH), for which at least 1 bit of field(TX-STOP) should be present. That is, by adding 1 bit of transmission stop field(TX-STOP) to all frame transmitting and receiving through the reverse channel, a transmission state is informed to the base station 20.(S60). Then, when a traffic overload on the cell is reduced, a value of the dynamic priority group(DPROTG) transmitted to the terminal 10 is lowered. Accordingly, the waiting terminal 10 compares the value of the dynamic priority(DPROT) given from the base station and the value of dynamic priority (DPROT) calculated by itself. As a result of the comparison, if a level of it own is higher, the waiting terminal 10 can only make a burst transmission of the RLP user frame through the reverse fundamental channel (or the dedicated control channel).(S70). In other words, a transition from the burst transmission suspension state to a resumption state should be made, and a number of preamble should be transmitted according to a parameter(RESUME_PREAMBLE) specified in the SCAM. In turn, the base station 20 can match a synchronization of the frame according to the parameter(RESUM_PREAMBLE). Then, the base station 20 keeps transmission of the dynamic priority group number field(P-DPROTG) to the terminal 20 through the dedicated control channel in 20 ms units.(S80).

In the meantime, even in cases of terminals 10 falling on G1 or G2, each terminal may reduce its own rate(i.e., a bandwidth), to transmit the frames continuously with the reduced bandwidth. For example, if the terminal 10 has a plurality of supplemental channels, a rate adaptation can be made by reducing a number of the supplemental channels. Otherwise, the terminal 10 may keep transmission of the frames in the wide bandwidth the same as before and, if the group level from the base station 20 is lowered, the terminal 10 may transmit the frames only through the fundamental channel without the supplemental channel. The above two operations can be available when the dynamic priority group(DPROTG) is higher than the group number field(P_DPROTG) permitted by the base station 20, which depends on an implementation of the terminal 10.

A terminal 10, either requesting a supplemental channel after the terminal 10 transmits all the user data frame to the base station 20, transits out of an active state, and transits into the active state again, or intending to make a burst transmission in an active state for making a call, can transmit the supplemental channel request message(SCRM) to the base station 20 only when a value of a permitted dynamic priority group field(P_DPROTG) received from the base station 20 through the fundamental channel is set to '0'. However, a terminal 10 with a priority higher than the default predefined priority can request the SCRM.

In the meantime, in making a call, a call with a high predefined priority should be assured of a QoS(FER, delay, throughput) of a quality better than a call with a low predefined priority. Accordingly, the coefficient K is applied to the equation (1) when the terminal 10 calculates the dynamic priority for the graded service.

The method for controlling a traffic load in a mobile communication system of the present invention has the following advantages.

First, the distribution of a traffic load in a traffic load congestion situation assures a service quality a terminal requires.

Second, a terminal with a high predefined priority can be served, correspondingly. And, the introduction of a dynamic priority assures the same service quality between terminals of identical level.

Third, the management of the dynamic priorities in groups allows the system for a flexible application of an appropriate rate adaptation to the terminals. That is, by decreasing the dynamic priority group number(P-DPROTG) by 20 ms frame boundary units, the most appropriate service quality can be provided according to a load.

Fourth, the overhead can be distributed by making the terminal to manage a dynamic priority for a reverse traffic congestion, and making the system to manage a dynamic priority for a forward traffic congestion.

It will be apparent to those skilled in the art that various modifications and variations can be made in the method for controlling a traffic load in a mobile communication system of the present invention without departing from the spirit or scope of the invention. Thus, it is intended that the present invention cover the modifications and variations of this invention provided they come within the scope of the appended claims and their equivalents.

What is claimed is:

1. A method for controlling a traffic load in a mobile communication system, comprising the steps of:
   (1) providing dynamic priority group numbers(P_DPROTG) which will be made available depending on a traffic load to each terminal which has a predefined priority in a cell, the dynamic priority group numbers (P_DPROTG) being provided in a system;
   (2) transmitting a permitted dynamic priority group number(P_DPROTG) from the system to each terminal in fixed time intervals depending on the traffic load;
   (3) each terminal calculating a dynamic priority(DRPOT) of the terminal;
   (4) each terminal comparing the P_DPROTG from the system and the DPROT calculated by the terminal itself, to determine a dynamic priority group number to which the terminal belongs; and,
   (5) according to a result of the determination in the step (4), each terminal determining, and executing a user data transmission to the system.

2. A method as claimed in claim 1, wherein the step (5) includes the steps of,
   transmitting a user data to the system when a level of the DPROT is higher than, or equal to a level of the P_DPROTG as a result of the determination, and
   waiting for the transmission of a user data to the system when the level of the DPROT is lower than the level of the P_DPROTG as the result of the determination.

3. A method as claimed in claim 2, further including the steps of;
   the system transmitting an updated P_DPROTG corresponding to the changed traffic overload to each terminal when a traffic load on the cell is changed;
   the waited terminal keeping checking the level of the dynamic priority of the waited terminal being higher than the level of the updated P_DPROTG; and,
   the waited terminal transmitting the waited user data to the system when the level of the dynamic priority of the waited terminal is higher than the level of the updated P_DPROTG.

4. The method as claimed in claim 1, further comprising the terminal transmitting the user data to the system without comparing the DPROT of the terminal to the P_DPROTG when a dynamic priority group (DRPOTG) of the P_DPROTG from the system is set to "0".

5. A method as claimed in claim 1, wherein the DPROT of the terminal is calculated with an equation, below;

$$DPROT = K(WQ+SQ)/SQ,$$

Where, DPROT denotes a dynamic priority, WQ denotes a waited quantity, SQ denotes a served quantity, WQ+SQ denotes data quantity required through an SCRM, and K is a coefficient based on a predefined priority.

6. A method as claimed in claim 1, wherein the fixed time interval is 20 ms.

7. A method as claimed in claim 1, wherein each of the terminals is a terminal which has an active packet data service state.

8. A method for controlling a traffic load in a mobile communication system, comprising:
   (1) providing dynamic priority group number fields (P_DPROTG) which will be made available depending on a traffic load to each of a plurality of terminals having a predefined priority in a cell, the dynamic priority group number fields (P_DPROTG) being provided in a system;

(2) setting up a forward fundamental channel (F-FCH) and a reverse fundamental channel (R-FCH) between the system and each of the terminals in one cell;

(3) transmitting a supplemental channel (SCH) request message (SCRM from each terminal to the system, and the system, in response to the transmission of the SCRM, transmitting a supplemental channel assignment message (SCAM) to each terminal;

(4) transmitting the P_DPROTG from the system to each terminal through the F-FCH according to the traffic load state;

(5) each terminal calculating a dynamic priority PPROT) of the terminal;

(6) each terminal comparing the DPROT of the terminal to the P_DPROTG from the system, to determine a dynamic priority group number to which the terminal belongs; and (7) one of transmitting user data to the system and temporarily blocking transmission of user data to the system according to a result of the determination of step (6).

9. The method as claimed in claim 8, further comprising transmitting a number of dynamic priority groups currently set up in the system and a dynamic priority boundary of each group from the system to each terminal in an overhead message through one of a paging channel and a common channel.

10. The method as claimed in claim 9, wherein the boundary of each group is a maximum value, and a dynamic priority boundary of the group ranges from a value that is one (1) greater than a maximum value of a group one stage lower than the group in question to the maximum value of the group in question.

11. The method as claimed in claim 8, wherein the step (7) further comprises: transmitting user data to the system when a level of the DPROT is greater than or equal to a level of the P_DPROTG as a result of the determination, and blocking the transmission of user data to the system when the level of the DPROT is lower than the level of the P_DPROTG as the result of the determination.

12. The method as claimed in claim 11, further comprising additionally transmitting a field X_STOP), informing a transmission OK of the user data of the blocked terminal, from the blocked terminal to the system through the F_FCH.

13. The method as claimed in claim 12, wherein the field (TX_STOP) is a 1 bit signal added to all frames transmitting and receiving through the R_FCH.

14. The method as claimed in claim 11, further comprising:

transmitting an updated P_DPROTG corresponding to the changed traffic overload from the system to each terminal when a traffic load on the cell is changed;

the blocked terminal repeatedly checking to determine if the level of the dynamic priority of the blocked terminal is higher than the level of the updated P_DPROTG; and the blocked terminal transmitting user data to the system when the level of the dynamic priority of the blocked terminal is higher than the level of the updated P_DPROTG.

15. The method as claimed in claim 14, further comprising transmitting the updated P_DPROTG from the system in fixed time intervals through the F-FCH after the blocked terminal transmits the user data to the system through the R_FCH.

16. The method as claimed in claim 15, wherein the fixed time interval is 20 ms.

17. The method as claimed in claim 8, further comprising transmitting the user data from the terminal to the system without comparing the DPROT of the terminal to the P_DPROTG when a dynamic priority group (DPROTG) of the P_DPROTG from the system is set to "0".

18. The method as claimed in claim 8, wherein the DPROT of the terminal is calculated with an equation, $$DPROT = K(WQ+SQ)/SQ,$$

where, DPROT denotes a dynamic priority, WQ denotes a waited quantity, SQ denotes a served quantity, WQ+SQ denotes data quantity required through an SCRM, and K is a coefficient based on a predefined priority.

19. The method as claimed in claim 8, wherein the fixed time interval is 20 ms.

20. The method as claimed in claim 8, wherein each of the terminals is a terminal which has an active packet data service state.

21. A method of controlling traffic in a mobile communication system, comprising the steps of:

receiving a permitted dynamic priority group number transmitted from a base station to a mobile terminal;

calculating a dynamic priority by the mobile terminal;

comparing the permitted dynamic priority group number to the calculated dynamic priority; and during the transmission of data to the base station and temporarily suspending transmissions to the base station based on a result of the comparison.

22. The method of claim 21, wherein data is transmitted to the base station when the calculated dynamic priority is greater than or equal to the permitted dynamic priority group number, and wherein transmissions are temporarily suspended to the base station if the dynamic priority is less than the permitted dynamic priority group member.

23. The method of claim 21, wherein the base station transmits the permitted dynamic priority group number to the mobile terminal when the traffic load on the communication channel exceeds a prescribed level.

24. The method of claim 21, wherein a priority of the mobile terminal is predefined in the mobile communication system.

25. A method of controlling traffic a communication system, comprising the steps of:

setting a priority level of each of a plurality of mobile terminals; and dynamically controlling data transmissions of each of the plurality of mobile terminals in accordance with the priority level of each mobile terminal and a congestion level of the communication system.

26. The method of claim 25, wherein the priority level of each mobile terminal is set by the corresponding mobile terminal.

27. The method of claim 26, wherein the priority level of each mobile terminal is set in accordance with a waited quantity, a served quantity, and a constant value based on a predefined priority.

* * * * *

UNITED STATES PATENT AND TRADEMARK OFFICE
CERTIFICATE OF CORRECTION

| | | |
|---|---|---|
| PATENT NO. | : 6,469,993 B1 | |
| APPLICATION NO. | : 09/223734 | |
| DATED | : October 22, 2002 | |
| INVENTOR(S) | : Chang Keun Seo and Cheol Kyun Heo | |

It is certified that error appears in the above-identified patent and that said Letters Patent is hereby corrected as shown below:

Col. 6, line 60, Claim 8, should read as follows:

8. A method for controlling a traffic load in a mobile communication system, comprising:

(1) providing dynamic priority group number fields (P_DPROTG) which will be made available depending on a traffic load to each of a plurality of terminals having a predefined priority in a cell, the dynamic priority group number fields (P_DPROTG) being provided in a system;

(2) setting up a forward fundamental channel (F-FCH) and a reverse fundamental channel (R-FCH) between the system and each of the terminals in one cell;

(3) transmitting a supplemental channel (SCH) request message (SCRM) from each terminal to the system, and the system, in response to the transmission of the SCRM, transmitting a supplemental channel assignment message (SCAM) to each terminal;

(4) transmitting the P_DPROTG from the system to each terminal through the F-FCH according to the traffic load state;

UNITED STATES PATENT AND TRADEMARK OFFICE
CERTIFICATE OF CORRECTION

| | |
|---|---|
| PATENT NO. | : 6,469,993 B1 |
| APPLICATION NO. | : 09/223734 |
| DATED | : October 22, 2002 |
| INVENTOR(S) | : Chang Keun Seo and Cheol Kyun Heo |

It is certified that error appears in the above-identified patent and that said Letters Patent is hereby corrected as shown below:

(5) each terminal calculating a dynamic priority (DPROT) of the terminal;

(6) each terminal comparing the DPROT of the terminal to the P_DPROTG from the system, to determine a dynamic priority group number to which the terminal belongs; and (7) one of transmitting user data to the system and temporarily blocking transmission of user data to the system according to a result of the determination of step (6).

Col. 7, line 42, Claim 12, should read as follows:

12. The method as claimed in claim 11, further comprising additionally transmitting a field (__T__X_STOP), informing a transmission OK of the user data of the blocked terminal, from the blocked terminal to the system through the F_FCH.

Col. 8, line 25, Claim 21, should read as follows:

21. A method of controlling traffic in a mobile communication system, comprising the steps of:

receiving a permitted dynamic priority group number transmitted from a base station to a mobile terminal;

UNITED STATES PATENT AND TRADEMARK OFFICE
CERTIFICATE OF CORRECTION

| | | |
|---|---|---|
| PATENT NO. | : 6,469,993 B1 | Page 3 of 4 |
| APPLICATION NO. | : 09/223734 | |
| DATED | : October 22, 2002 | |
| INVENTOR(S) | : Chang Keun Seo and Cheol Kyun Heo | |

It is certified that error appears in the above-identified patent and that said Letters Patent is hereby corrected as shown below:

calculating a dynamic priority by the mobile terminal;

comparing the permitted dynamic priority group number to the calculated dynamic priority; and during the transmission of data to the base station, [[and]] temporarily suspending transmissions to the base station based on a result of the comparison, wherein the base station transmits the permitted dynamic priority group number to the mobile terminal in accordance with a traffic load on a communication channel.

Col. 8, line 48, Claim 25, should read as follows:

25.    A method of controlling traffic a communication system, comprising the steps of:

setting a priority level of each of a plurality of mobile terminals; and dynamically controlling data transmissions of each of the plurality of mobile terminals in accordance with the priority level of each mobile terminal and a congestion level of the communication system, wherein each of the mobile terminals is assigned to a priority group according to the priority level of the corresponding mobile terminal, and wherein a base station dynamically controls data transmission

UNITED STATES PATENT AND TRADEMARK OFFICE
CERTIFICATE OF CORRECTION

PATENT NO. : 6,469,993 B1
APPLICATION NO. : 09/223734
DATED : October 22, 2002
INVENTOR(S) : Chang Keun Seo and Cheol Kyun Heo It is certified that error appears in the above-identified patent and that said Letters Patent is hereby corrected as shown below:

<u>of each of the mobile terminals by transmitting a priority group number to each of the mobile terminals indicating which groups are authorized to transmit data, and wherein mobile terminals assigned to a priority group that is not authorized to transmit are temporarily blocked from transmitting while maintaining a physical channel</u>.

Signed and Sealed this

Twenty Second Day of April, 2008

JON W. DUDAS
*Director of the United States Patent and Trademark Office*